(12) United States Patent
Hopwood Thomas

(10) Patent No.: US 10,268,208 B1
(45) Date of Patent: Apr. 23, 2019

(54) GUST RESISTANT LOCATION MARKER

(71) Applicant: Amazon Technologies, Inc., Seattle, WA (US)

(72) Inventor: James Matthew Hopwood Thomas, Cambridgeshire (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/795,160

(22) Filed: Oct. 26, 2017

(51) Int. Cl.
*B64C 39/02* (2006.01)
*G06Q 10/08* (2012.01)
*G05D 1/06* (2006.01)
*G06K 19/02* (2006.01)

(52) U.S. Cl.
CPC ......... *G05D 1/0676* (2013.01); *B64C 39/024* (2013.01); *G06K 19/025* (2013.01); *G06Q 10/0832* (2013.01); *B64C 2201/18* (2013.01)

(58) Field of Classification Search
CPC ... B64C 39/024; G08G 5/0069; G06Q 10/083

USPC ........................................................ 235/375
See application file for complete search history.

(56) References Cited

U.S. PATENT DOCUMENTS

| 9,412,280 B1* | 8/2016 | Zwillinger | ........... G08G 5/0069 |
| 2015/0183528 A1* | 7/2015 | Walsh | ....................... B64F 1/32 |
| | | | 701/3 |
| 2018/0130008 A1* | 5/2018 | Liu | ....................... G06Q 10/083 |

* cited by examiner

*Primary Examiner* — Toan C Ly
(74) *Attorney, Agent, or Firm* — Lee & Hayes, P.C.

(57) ABSTRACT

A location marker may be used to provide information to a vehicle, such as an unmanned aerial vehicle (UAV). The location marker may be configured with folds and or apertures to provide aerodynamics that prevent or minimize movement of the location marker when subjected to moving air, such as wind or downwash created by the UAV. A location marker may be delivered to an address prior to a parcel delivery by a UAV, and may form a part of the packaging of a prior parcel delivery. Alternatively, a location marker may be delivered to an address electronically and printed and configured into a gust-resistant shape and placed in a suitable location to provide information to a UAV.

21 Claims, 6 Drawing Sheets

GUST RESISTANT LOCATION MARKER

BACKGROUND

Currently, a majority of deliveries are conducted manually by delivery personnel going door-to-door. However, the unmanned aerial vehicle (UAV) has great potential as an expedient and energy efficient vehicle for delivering goods to consumers. For example, after processing an order for a product, a UAV may transport the product to a delivery location, such as a consumer's home or office. The UAV may fly autonomously at times and may navigate to an assigned destination. Often, UAVs rely on a global positioning system (GPS) for navigation. However, GPS is subject to some errors and inaccuracy, and may not afford a UAV accuracy needed to discriminate a correct delivery location from an incorrect delivery location, especially when delivery locations are very close together, such as within feet of one another.

Landing markers are sometimes used to guide a vehicle to a specific landing zone. Often, landing markers are permanent fixtures that are painted on a landing pad. Mobile landing markers may be used but are subject to weather conditions and conditions created by the UAV.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
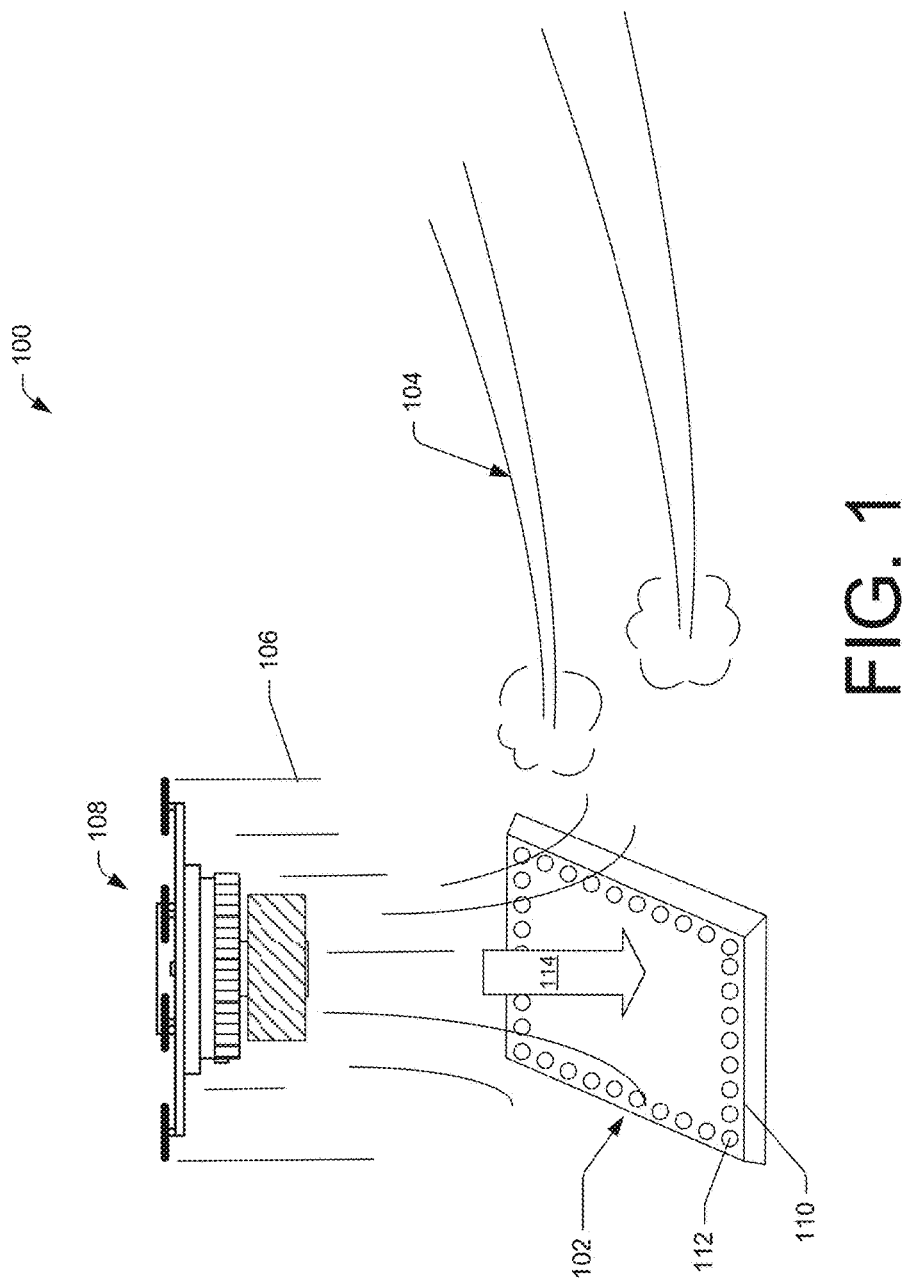
FIG. 1 is a schematic diagram of an illustrative environment that includes a location marker that is resistant to gusts.

This disclosure is directed to a location marker that may be used to provide information to a vehicle, such as an unmanned aerial vehicle (UAV). A portable location marker may include an upper generally flat top surface that has edges. A sidewall may extend from each of the edges downwardly, and may form an obtuse angle with the top surface. Additionally, a plurality of apertures is formed in the top surface next to one or more of the edges. The location marker may include a code on the top surface that provides indicia to an unmanned aerial vehicle. The location marker may be formed as a rectangular, a circle, a parallelogram, and/or as other symmetrical or non-symmetrical shapes.

In some cases, the location marker is delivered as an electronic computer file and is printed onto media along with instructions for configuring the location marker with the sidewalls and the plurality of apertures. The electronic computer file may be e-mailed to a computing device associated with a recipient of an order placed at an online shopping system. The electronic computer file may likewise be downloaded by the computing device, such as by providing a link to the file for download.

In some cases, the location marker is formed as an integral part of a shipping container and may be configured for removal from the shipping container. For example, the location marker may be formed by a series of perforations in a box or envelope. The location marker may further be defined by one or more lines of weakness that allow the location marker to be folded into a suitable shape. For instance, the one or more lines of weakness may be formed by pre-folding, embossing, pressing, forming a groove, forming perforations, or some other method of encouraging the location marker to be preferentially deformed at a specific location. Alternatively, the lines of weakness may be merely printed lines upon a surface that is already sufficiently capable of being folded without assistance, for example fold lines on a sheet of paper or cardboard.

The location marker may have one or more shapes in the top surface defined by perforations through the location marker. The shapes may be formed as circles, squares, and/or other shapes and the perforations may allow the shapes to be easily removed from the location marker to form apertures resembling the shape.

According to some embodiments, a method includes providing an electronic file associated with a location marker to an address. The address may be an email address, a uniform resource locator (URL), an IP address, or some other address that allows the electronic file to be delivered, downloaded, or otherwise accessed by a computing device. The electronic file may contain instructions for printing and configuring the location marker. For example, the instructions may include computer code that drives a 3D printer to print a location marker out of 3D printing media. A 3D printer may form a location marker having apertures, folds, and/or angled sidewalls to provide the gust resistant benefits described herein. The instructions may further be a graphics file, a text file, or a file that includes both text and graphics for printing on a suitable printer, such as a laser printer or inkjet printer.

The method further includes providing an instruction to deploy the location marker. The instruction may specify a day, a time, a window of time, or a combination. In any event, once a delivery window during which the UAV is expected to arrive at a location for a delivery, an instruction specifies when the location marker should be available to the UAV.

The method includes dispatching an unmanned aerial vehicle (UAV) to a physical location associated with the address. The physical location may be a street address, GPS coordinates, an identification of a building, or some other physical location. The physical location can be associated with the address such as by associating an e-mail address with a person, and further associating a street address with the person. Similarly, a physical delivery address may be associated with an IP address, and email address, a GPS location, or some other association that allows an address to be correlated with a physical location.

Once the UAV is near the physical location, the UAV captures one or more images of the location marker. The location marker further includes instructions for the UAV, which may identify the physical location, an order identifier, or some other identifier that indicates to the UAV the delivery location. The UAV may analyze the images of the location marker to determine the instructions for the UAV. Finally, the UAV can execute the instructions, which may include a precise location or delivering a parcel, such as five feet to the North of the location marker.

The instructions for printing and configuring the location marker may include instructions for folding or forming holes in the location marker. For instance, the location marker may be printed on a paper-based media and provided with lines for folding or indicia for forming apertures.

The instructions to deploy the location marker may indicate a day and a time for deploying the location marker, such as a window of time during which the UAV is expected to arrive at the physical location.

According to some embodiments, a portable location marker is integrated into a shipping container. The shipping container may be formed of corrugated cardboard, non-corrugated cardboard, plastic, or may be a paper-based container, such as an envelope or other such suitable shipping container. The location marker may include a perforated outline that defines an outer boundary of the location marker. One or more predefined lines of weakness may define lines that facilitate folding the location marker into an appropriate shape. In addition, one or more perforated shapes may define apertures in the location marker once the shapes are removed. Indicia may be provided on the location marker that provides instructions to an unmanned aerial vehicle (UAV). The indicia on the location marker may identify the location marker as a location marker. It may further include second indicia that provides information to the UAV associated with a delivery of a parcel to a physical location. This may include, for example, areas to avoid, a specific location to place a parcel (e.g., 10 feet South of the position of the location marker), the location of buildings or other obstructions within the vicinity of the location marker.

The second indicia may be attached to the location marker, and may be printed onto paper and then affixed to the location marker, such as by tape, glue, staples, or some other suitable method. The second indicia may be provided in an electronic file that a user may print out and affix to the location marker prior to a delivery by the UAV.

The perforated shapes may be any suitable shape, such as circles, squares, rectangles, or a combination. The perforated shapes may be defined by perforations that extend through a thickness of the location marker to allow easy removal of the shapes from the location marker to form apertures resembling the shape. The apertures may be formed in any configuration and location about the location marker, and may be staggered, positioned near the periphery, on the sidewalls, through the center, or a combination.

The location marker may include instructions for configuring the location marker into a gust-resistant shape, such as by folding the location marker and/or punching out shapes or creating apertures to make the deliver marker resistant to gusts of wind.

The techniques, apparatuses, and systems described herein may be implemented in a number of ways. Example implementations are provided below with reference to the following figures.

FIG. 1 is a schematic diagram of an illustrative environment 100 that includes a location marker that is resistant to wind gusts. A location marker 102 is subject to environmental factors, such as wind gusts 104 and downwash 106 caused by an unmanned aerial vehicle (UAV) 108. In some implementations, the location marker 102 may be relatively lightweight and can therefore be influenced by the environmental factors. In some instances, wind gusts 104 and/or downwash 106 can dislocate the location marker 102 which may disrupt delivery of a package by the UAV 108 that is searching for the location marker. The location marker 102 may be blown away, moved to another location, flipped over so that any instructional or informational markings may not be visible to the UAV 108, or may be reoriented such that instructional or informational markings may be inaccurate.

The location marker 102 may be configured with folds 110, one or more apertures 112 (e.g., holes, slots, tears, or perforations), or a combination of both folds and apertures. By configuring the location marker 102 with the apertures 112 and/or folds 110, the location marker 102 can selectively be configured to be resistant to wind gusts by altering the aerodynamics of the location marker 102. For example, the location marker 102 can be configured with folds 110 and apertures 112 to create a down force 114 in response to wind gusts 104. In this way, a location marker 102 may be inhibited from moving in response to wind gusts 104 or downwash 106 from the UAV 108 flying above or near the location marker 102. According to some embodiments, the apertures 112 allow pressure equalization above and below the location marker 102 to stabilize the location marker 102 as wind gusts 104 are present.

The folds 110 may be configured to direct airflow from wind gusts 104 over the location marker 102 while inhibiting wind gusts 104 from traveling underneath the location marker 102 and lifting an edge of the location marker 102.

Figure 2:
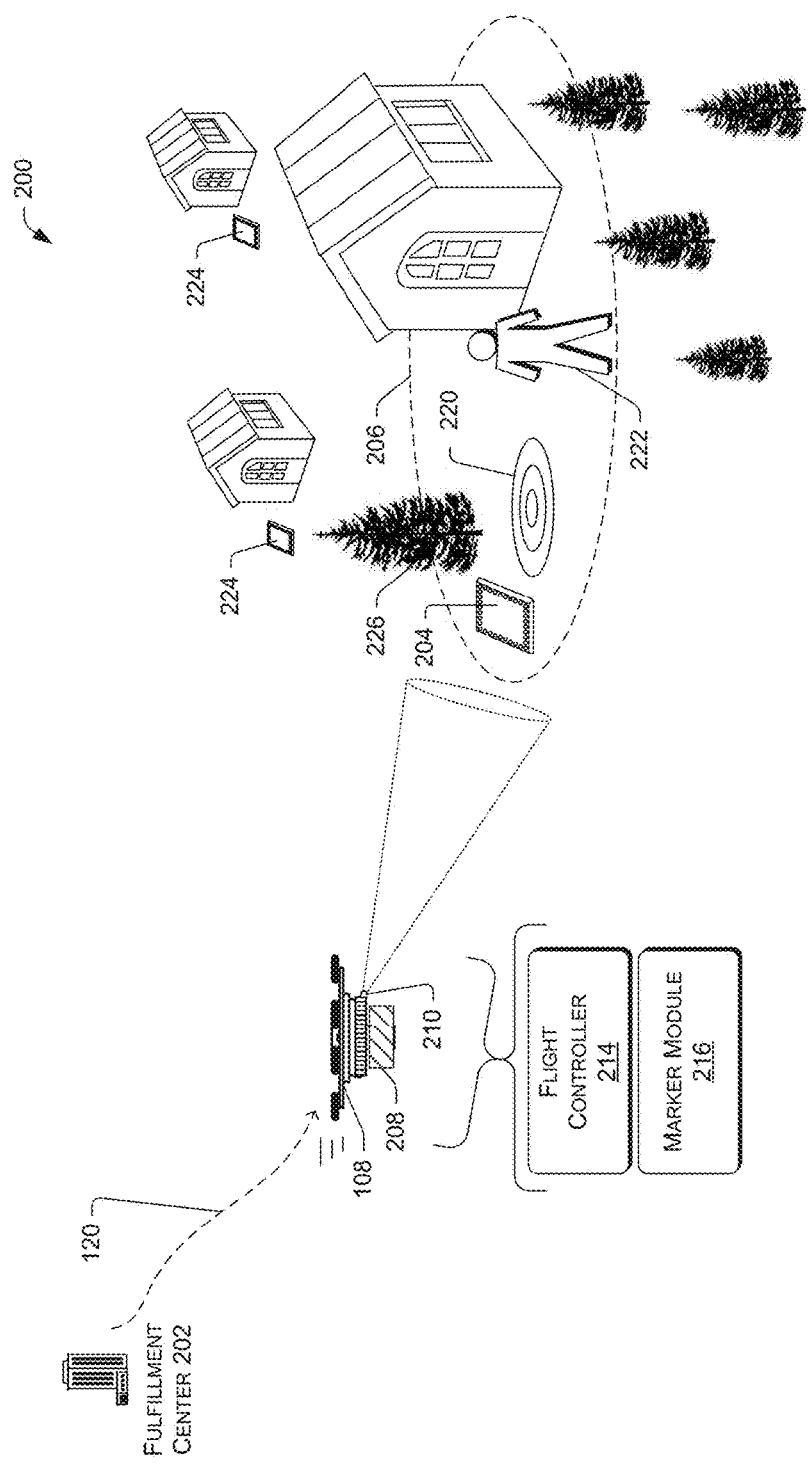
FIG. 2 is a schematic diagram of an illustrative environment that includes a location marker configured to be resistant to wind gusts.

FIG. 2 is a schematic diagram of an illustrative environment 200 that includes a location marker that is resistant to gusts and is further configured to visually identify a location for an unmanned aerial vehicle (UAV). The environment 200 includes a fulfillment center (FC) 202 where a UAV 108 may originate a flight directed to a location marker 204 at a destination 206, such as a location associated with a recipient of a package 208 transported by the UAV 108.

The UAV 108 may be equipped with one or more image sensors 210 used to detect visible light or non-visible light (e.g., infrared light, etc.). The image sensor(s) 210 may include cameras, such as a stereo camera pair used for guidance purposes by the UAV 108. The image sensor(s) 110 may capture imagery of a location that includes a location marker 204, and may enable detection of the location marker 204 and possible extraction of information from the location marker, as discussed below.

The UAV 108 may be equipped with a number of components to enable the UAV 108 to perform operations during the delivery of the package 208 and to identify and extract information from a location marker 204. The components may include a flight controller 214 and a marker module 216. The UAV 108 may travel under control of the flight controller 214 and along a flight path 122 toward the destination 106. The flight controller 114 may continually or from time to time provide controls to cause change in a velocity of the UAV, a change in heading, a change in altitude, a change in orientation, and/or other changes (e.g., pitch, roll, yaw, hover, etc.). In addition, the UAV 108 may execute different controls based on different flight scenarios, such as a takeoff stage, a transport stage, a package deposit stage, and/or a landing stage of flight.

The marker module 116 may detect a location marker 204 via analysis of imagery that includes the location marker 204 and/or may interpret information from the location marker 204. The location marker 204 may be associated with a specific location 220, such as a physical location to deposit the package 108. However, the location may be associated with other information, such as a waypoint for navigation, an obstacle 226, a location for an autonomous vehicle (or taxi) to pick up passengers, and so forth. The location marker 204 may include indicia to provide information readable by the marker module 116. The marker module 116, via analysis of the imagery of the location marker 204, may determine an identifier associated with the location marker 204, which may be associated with a recipient 222 of the package 208. In some embodiments, the identifier may be a location identifier. The location identifier may be a unique code, a physical address (e.g., a street address, a house number, etc.), a customer identifier, and/or other location information (e.g., coordinates, etc.). The identifier may include text, images, codes, or any combination of information that can be captured by the image sensors 210 and readable by the marker module 216.

For example, the recipient 222 may be assigned an identifier, which is printed or otherwise affixed to the location marker 204, to inform the UAV 108 of a specific location associated with the recipient 222. The location may be the location of a home or other dwelling, or the location may be associated with a place of presence of the recipient 222 at a given time or period of time. For example, a person may bring the location marker 204 to a park or other public space, such as where the person is having a picnic during the afternoon. The location marker 204 may enable a UAV or other vehicle to locate the person. Thus, the location marker 204 may be portable and may be associated with different locations, as discussed in greater detail below. The identifier on the location marker 204 may be different from identifiers on other location markers 224, but may not be unique among all location markers.

In some embodiments, the information provided by the location marker 204 to the marker module 116 may provide the identifier and/or other messages such as indication of a preferred approach and/or departure to a location, presence of obstacles 226, information about the recipient 222, and/or other information. For example, the indication may identify specific information to assist the UAV 108 in successfully depositing the package 208, including how to deposit the package (e.g., landing, dropping from the air, etc.), and/or other instructions, messages, or information.

In some embodiments, the delivery location may be a pre-determined location in proximity to the location marker. In other examples, the delivery location may be determined in real-time based on the size of the UAV, the size of the package, obstructions present in a pre-determined delivery location and/or other factors.

The location marker 204 may include a shape that, when analyzed by the UAV 108 or other device, communicates a direction. The direction may be determined based on how the recipient 222 places or orients the location marker 204. The direction may cause the UAV 108 to determine an approach to the location 220. The direction may be selected to cause the UAV 108 to avoid obstacles 226, such as trees, structures, equipment, animals, and people.

In some embodiments, the location marker 204 may provide additional information to the UAV 108, such as a glide slope associated with an approach angle.

The location marker 204 may be formed of any suitable material, such as paper, cardboard, plastic, paper board, wood, or some other suitable material. In some cases, the location marker 204 may be formed of paper, and may be printed from a printer associated with the user 222. The user 222 may download an image or document that can be printed on the user's printer. The printed location marker 204 can include the identifier or other messages to the UAV 108. Furthermore, the printed location marker 204 may include instructions on how to form the location marker 204 to be gust resistant. For example, the location marker 204 can be printed to show fold lines and areas where apertures can be created, such as by cutting, punching, or tearing.

The location marker 204 may be printed to show instructions on how to form the location marker on one side, and the other side can be printed with information specific for the UAV 108.

Figure 3:
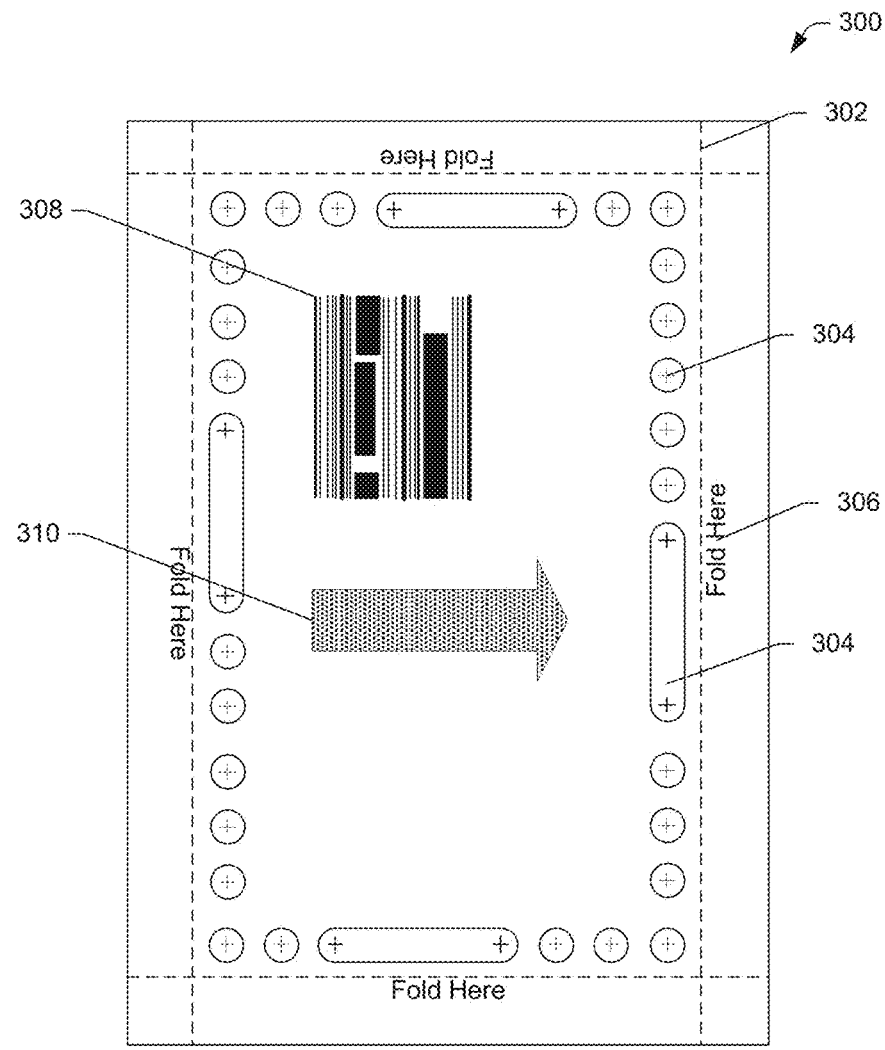
FIG. 3 is a plan view illustration of a gust resistant marker.

FIG. 3 is a top plan view of one example of a location marker 300 that can be printed onto a suitable material by a printer. In some cases, the location marker 300 can be printed onto paper, such as 20 lb bond (75 g/m$^2$) paper. Of course, other bonds may be used for printing a location marker 300, such as 24 lb, 28 lb, or 32 lb paper, or some other weight. Other papers may also be used to print a location marker 300, such as, for example, card stock, paper board, or construction paper, to name a few.

In some instances, the location marker 300 may be printed by a suitable 3D printer, and may be printed in any suitable material, such as ABS plastic, PLA, nylon, epoxy, wax, or polycarbonate, for example. A file associated with the location marker may be delivered electronically to an address. For instance, a user may download a suitable file associated with a landing marker, or a file may be delivered to an email address. The file may be any suitable file that provides a user the ability to create the location marker 300. In some instances, the file may be a portable document file, an image file, a word processing file, a stereo lithography file, a virtual reality modeling language file, an additive manufacturing file, a GCode file, or any other suitable file that allows a location marker 300 to be printed or otherwise manufactured at the delivery location in either 2D or 3D of a location marker 300.

In some embodiments, the location maker 300 has indicia thereon that directs a recipient on how to form the location marker 300. For instance, indicia may include one or more fold lines 302 that indicate to a recipient where to fold the location marker 300 prior to deployment. The indicia may further include one or more aperture locations 304. The aperture locations 304 may indicate to a recipient where to cut, punch, or tear the location marker 300 to allow air to flow therethrough. The apertures may be formed by using a hole punch, scissors, a knife, tearing, or some other suitable cutting or punching tool. While the illustrated embodiment of FIG. 3 illustrates holes or slots adjacent to the fold lines 302 and the periphery of the location marker 300, the size, pattern, and distribution of the aperture locations 304 may be any of a number of suitable configurations. Likewise, the fold lines 302 may be positioned at any location and any orientation on the location marker 300.

The location marker 300 may include instructions 306 on how to configure the location marker 300. For example, the instruction 306 to "fold here" may be provided on the location marker to instruct a recipient on where to fold the location marker 300. In some embodiments, the location marker 300 may be configured with predefined lines of weakness that allow the material to be folded in the desired location.

Additional instructions may be provided on the location marker, such as, for example, an instruction to use tape or staples to secure the location marker 300 in a desired configuration. For instance, the instructions may prompt a recipient to fold the location marker 300 along a fold line 302 and then use tape, staples, glue, or some other mechanism for securing the location marker 300 in the folded configuration. Instructions may additionally be provided by a scannable code printed on the location marker 300. In some cases, a code, such as a quick response code ("QR code") may be printed on the location marker 300 and can be scannable by a computing device associated with the recipient which may provide a link to instructions on how to assemble or configure the location marker 300. Similarly, a uniform resource locator ("URL") may be printed on the location marker that directs the recipient to visit a website which may provide instructions for configuring the location marker 300. In those embodiments in which the recipient is directed to a website, photographic, textual, and video media may be provided to instruct the user on how to create, configure, assemble, or deploy the location marker 300.

UAV instructions may additionally be printed, or otherwise affixed to, the location marker 300. For instance, UAV instructions may include a code 308 that the UAV captures through an imaging device and the code may provide instructions to the UAV. In some instances, the UAV instructions 308 may identify the delivery location to ensure that the UAV has arrived at the proper location for a delivery. The UAV instructions 308 may provide additional, or alternative information, as well, such as landing instructions, identifying obstacles, or providing a confirmation of an order number or a parcel number. Location instructions 310 may additionally be provided that may indicate to the UAV where to land, areas to avoid, or some other information.

In some embodiments, the indicia and/or instructions to the recipient may be located on one side of the location marker 300 and the indicia or UAV instructions specific to the UAV 108 may be provided on the opposing side of the location marker 300. The location marker 108 may be configured this way during printing, such as where a recipient prints the location marker, or prior to the location marker 300 being delivered to the recipient. In some cases, a recipient may have a printer that is capable of printing on both sides of media inserted into the printer (e.g., duplex printing). In such cases, the recipient may print both sides of the location marker 300 with a single pass through the printer. In other situations in which a recipient has a printer that is only capable of printing on a single side of media, the recipient may pass the media through the printer twice in order to print the necessary indicia and/or instructions on both sides of the media.

The location maker 300; however, is not limited to being printed on a recipient's printer. The location marker 300 may be formed of any suitable material and can be made by the recipient, or be delivered to the recipient through some other method. For instance, a location marker 300 may be mailed to the recipient through a post delivery service. A location marker 300 may be included in a package that is delivered to a recipient, which can be used for subsequent UAV deliveries. Additionally, a location marker 300 may be formed from all or a portion of packaging container materials that are delivered to a recipient as will be described later herein.

Figure 4:
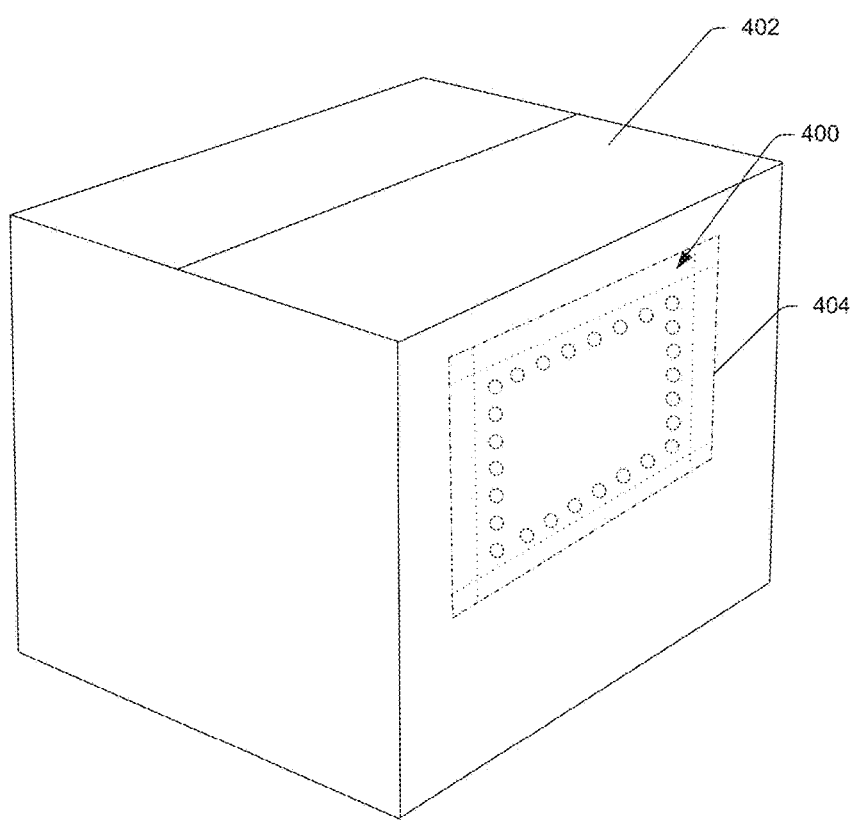
FIG. 4 is a perspective view of a gust resistant marker that is integral with a delivery container.

FIG. 4 illustrates a location marker 400 integrated with a delivery container 402. As illustrated, the location marker 400 may be integrated into a box, such as a corrugated cardboard box. The location marker 400 may be defined, at its outer periphery, by a line of weakness 404, such as perforations, which may make its removal from the remainder of the delivery container 402 intuitive and relatively easy. In some embodiments, the perforations may be made through the entire sidewall of the box so that the location marker 400 may be removed without the use of any cutting tools. According to other embodiments, the line of weakness 404 may be formed by making the material of the box thinner at the line of weakness to facilitate the separation of the location marker 400 from the container 402. In other embodiments, lines of weakness 404 may comprise printed guide lines on container 402 to guide a user in cutting out the location marker 400 using cutting tools (e.g., scissors, knife, etc).

While the illustrated embodiment shows a corrugated cardboard box as the container 402, the same principles apply to other types of containers, such as for example, envelopes, folders, plastic shipping or storage containers, crates, Styrofoam containers, or other types of shipping or delivery containers. Moreover, the instructions specific for the UAV need not be printed directly onto the location marker 400. For instance, the UAV instructions may be provided as stickers that can be adhered to a delivery marker 400. This way, a delivery marker 400 may be generic and can be specifically configured for a particular delivery through adhering stickers containing specific instructions or indicia for the UAV. Similarly, rather than pre-printing the instructions onto a sticker, the instructions to the UAV may be downloaded or otherwise acquired by a recipient, and printed at the recipients location and then affixed to a location marker 400. Thus, a generic location marker 400 can be specially configured with information for a UAV once a delivery has been scheduled.

In some cases, where a recipient places an order for goods, such as through an online shopping system, the specialized instructions that facilitate delivery by a UAV can be provided to the recipient, who can then affix the instructions to a location marker 400. The instructions may be sent through electronic mail, may be physically delivered to the recipient such as through a mailing service, or may be downloaded from the internet. The recipient can affix the instructions to the location marker 400 through any suitable means, such as without limitations, tape, glue, adhesive, staples, clips, rubber bands, fasteners, or any other suitable attachment hardware or method. A delivery container 402 may include one or more location markers 400 that a recipient can detach from the delivery container 402 and save for a future UAV delivery and the location markers 400 can be customized for a specific delivery at a future time prior to a UAV delivery.

The specialized instructions may be provided as text, images, codes, or a combination. The specialized instructions may provide information to the UAV, such as the address, an order number, some other identification of the location, information related to obstructions, unauthorized airspace, pets, a delivery location spaced a part from the location marker 400, or some other information that facilitates a delivery by, or landing of, the UAV.

Figure 5:
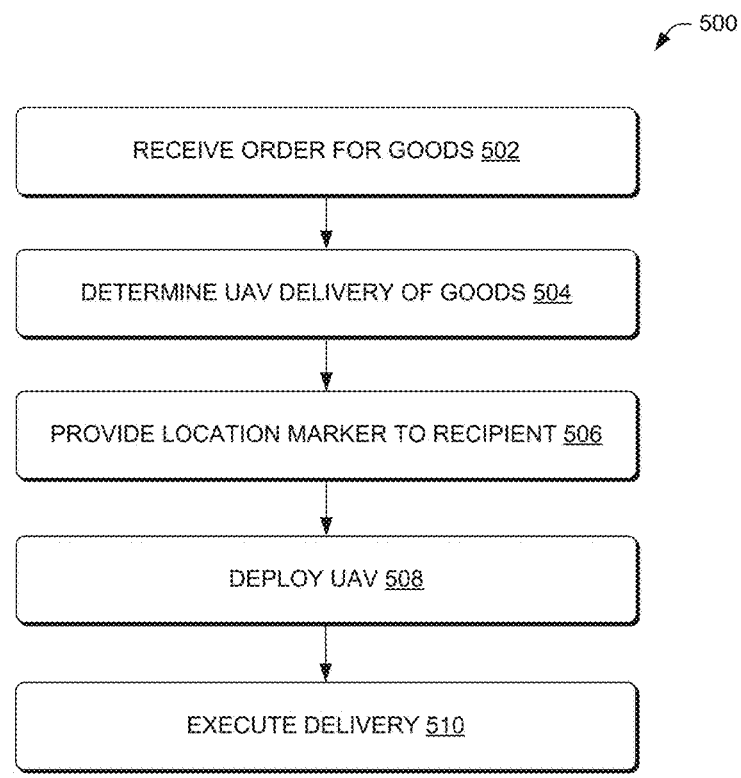
FIG. 5 is a flow diagram illustrating an example process for conducting a delivery by a UAV utilizing a location marker.

FIG. 5 illustrates a flow diagram 500 for providing and implementing a location maker to facilitate a UAV delivery. At block 502, an order for goods is received. The order may be received by an online shopping service. At block 504, a determination is made that at least a portion of the order for goods is to be delivered by UAV. Of course, not all goods are suitable for UAV delivery, and an order may be split into multiple deliveries or multiple delivery modes. The determination to delivery via UAV may be based on many factors, including the size or weight of the goods, the distance from a distribution center to the delivery location, any applicable regulations that may allow, limit, or influence UAV delivery, among other factors.

At block 506, a location marker is provided to the recipient. This may be done, for example, by providing a link to the recipient that can be used to download a file for printing on the recipient's own printer. It may also include providing a link to the recipient that allows the recipient to print out just the UAV instructions to facilitate delivery. The UAV instructions may be printed on standard printer paper and then affixed to a separate location marker. The UAV instructions may be sent to the recipient through a physical mail service, and may be formed with an adhesive surface to allow the recipient to adhere the UAV instructions onto a location marker. The location marker may be provided by sending the location marker through regular or expedited mail such that the recipient receives the location marker before the scheduled UAV delivery. In other cases, a location marker is provided as part of a package that an online retailer has previously sent to the recipient.

At block 508, a UAV is deployed for the delivery. The UAV deployment may be scheduled at the conclusion of the order for goods, or may be schedule at some future point, such as based upon the schedule of the recipient.

At block 510, the delivery is executed. In some instances, a UAV may be scheduled to leave a fulfillment center and its flight time to the delivery location can be determined with a reasonable degree of accuracy. Thus, the recipient may be notified of a delivery window in which the UAV is expected to arrive. The recipient may therefore be instructed to place the location marker in a suitable location prior to the expected delivery time so that the UAV can find the location maker, capture any UAV instructions that are a part of the location marker, and execute the delivery. The UAV instructions may provide additional instructions to the UAV. For example, the UAV instructions may notify the UAV of a local charging station with an instruction to travel to the charging station and exchange a power pack. The UAV instructions may notify the UAV of a scheduled or an unscheduled task to perform.

Figure 6:
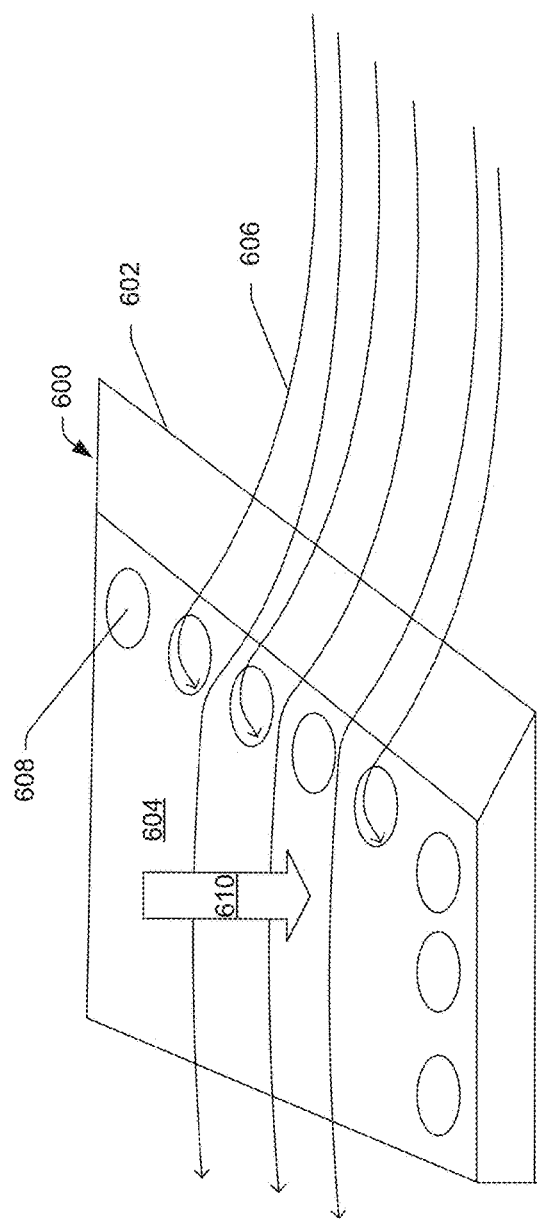
FIG. 6 is a schematic illustration showing airflow across a location marker having folds and apertures.

FIG. 6 illustrates a wind flow pattern in the presence of a location marker 600. The illustrated location marker 600 has a leading edge 602 that is generally the first surface the air will encounter. In some instances, the location marker 600 is shaped such that when in use, the leading edge 602 is below a top surface 604. Consequently, airflow 606 in a generally horizontal direction will impinge upon the leading edge 602 and flow upwardly and over the top surface 604.

Generally speaking, stagnant air, such as air located underneath the location marker, will exert a higher pressure on the location marker than will moving air traveling across the top surface 604. This pressure differential, demonstrated mathematically by the Bernoulli equation, will create lift on the location marker 600. Where the lift force overcomes the weight of the location marker 600, the location marker may be lifted off the ground and blown about by the wind. Furthermore, turbulent airflow may cause one edge of the location marker 600 to slightly lift, thereby allowing a greater volume of moving air to flow underneath the location marker 600, which may cause the location marker 600 to deflect upwardly and become more oblique to the direction of the wind and be caught by the wind as a sail and blown about.

In some embodiments, the location marker 600 may be configured with one or more apertures 608 that allow the airflow to pass therethrough. The apertures not only allow moving air to pass therethrough to equalize the pressure above and below the location marker 600, but may also impart a down force 610 on the location marker due to the curvature of the streamline which develops a pressure gradient perpendicular to the direction of flow. The curvature of the streamline provides a down force 610 onto the landing marker, which encourages the location marker 600 to remain static even in the presence of a moderate wind.

The wind may have different effects on the landing marker 600 based upon the material that the landing marker 600 is made of and the overall weight of the landing marker 600. In those cases where the landing marker 600 is formed of paper, examples of which have been provided herein, the configuration of the landing marker allow it to remain in place even in the presence of wind gusts.

Similarly, a rotary-winged UAV will impart a downwash airflow onto the landing marker when the UAV is in proximity of the landing marker. This airflow may be turbulent and have a tendency to dislodge a flat piece of paper; however, based upon testing, it has been observed that configuring a paper landing marker with folds and apertures as illustrated significantly increases the landing marker's ability to remain in place even in the presence of UAV downwash.

In a typical use, a recipient will place a location marker 600 on the ground at the delivery location prior to a scheduled UAV delivery. As described, the location marker 600 may be printed by the recipient, may be sent to the recipient, or may be a part of a shipping container that was sent to the recipient. The location marker 600 may have instructions, or instructions may be provided separately, such as on a printed sheet, on a website, or in an email. The instructions explain to the recipient how to assemble the location marker 600, which may include folding, tearing, cutting, punching, taping, gluing, stapling, or the like. The location marker 600 may also have UAV instructions printed or affixed thereon. The UAV instructions may provide a visual cue to the UAV that can capture and analyze an image of the UAV instructions.

The UAV instructions may direct the UAV to deliver a package at the location of the location marker 600, or a location in proximity of the location marker 600. The UAV instructions may further include information associated with flight paths, descent angles, obstacles, recipient information (e.g., address, order number, customer number, etc.), or other information that is usable by the UAV.

Subsequent to use, the location marker 600 may be discarded, or may be saved for a future use. In some instances, a landing marker includes UAV information that is associated with a specific delivery and may be discarded after use. Additionally, a location marker 600 that is printed by the recipient may likewise be intended for a single use and discarded after use. A location marker 600 that is sent to the recipient, either as an item in a shipping container, or as part of the shipping container, may be discarded, but in some cases, can be saved for a future delivery. The UAV information on a reusable location marker 600 may be updated where the UAV information is specific to a delivery. For example, the UAV information may be printed by a recipient and affixed, attached, or carried by the location marker 600.

In some instances, a recipient, in order to be eligible for UAV deliveries, is instructed to purchase a reusable landing marker. In some cases, a reusable landing marker may be specific to a recipient and include UAV information, such as a customer number, delivery address, or some other identifier that allows the UAV to ascertain a delivery location and/or other delivery instructions.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A portable location marker, comprising:
an upper generally flat top surface, the top surface being bounded by one or more edges defined by one or more lines of weakness;
a plurality of sidewalls extending downwardly from the one or more edges, wherein the one or more lines of weakness promote the plurality of sidewalls to be folded with respect to the top surface;
a plurality of apertures formed in the top surface, adjacent the one or more edges; and
an indicia on the top surface, the indicia readable by an unmanned aerial vehicle to provide at least information about a delivery location.

2. The portable location marker as in claim 1, wherein a sidewall of the plurality of sidewalls extends from one of the edges in an obtuse angle measured between the top surface and the sidewall.

3. The portable location marker as in claim 1, wherein the portable location marker is delivered as an electronic computer file and is printed onto paper media along with instructions for configuring the location marker with the plurality of sidewalls and the plurality of apertures.

4. The portable location marker as in claim 1, further comprising a shipping container having a first side, the first side comprising the portable location marker that is removable from the shipping container.

5. The portable location marker as in claim 1, further comprising one or more shapes in the top surface defined by perforations through the portable location marker that facilitate the shapes being removed from the portable location marker to form the plurality of apertures.

6. The portable location marker as in claim 1, wherein the information about the delivery location comprises at least one of:
a location at the delivery location to deliver a parcel;
a waypoint to be used for navigation; or
information about an obstruction proximate the delivery location.

7. The portable location marker as in claim 1, wherein the portable location marker is delivered with an instruction to deploy the portable location marker on a day during a time window.

8. A method, comprising:
providing an electronic file associated with a location marker associated with a delivery location, the electronic file comprising set-up instructions to print and configure the location marker by creating at least one of a fold or a hole in the location marker;
providing an instruction to deploy the location marker;
dispatching an unmanned aerial vehicle (UAV) to the delivery location;
capturing, by the UAV, one or more images of the location marker, the location marker further comprising instructions for the UAV;
analyzing, by the UAV, the one or more images of the location marker to determine the instructions for the UAV; and
executing, by the UAV, the instructions for the UAV.

9. The method as in claim 8, wherein the instruction to deploy the location marker indicates a day and a time for deploying the location marker.

10. The method as in claim 8, wherein the instructions for the UAV include information that identifies the delivery location to the UAV.

11. The method as in claim 8, wherein the instructions for the UAV include a location at the delivery location to deliver a parcel.

12. The method as in claim 8, wherein the electronic file includes computer-readable instructions to operate a three-dimensional printer.

13. The method as in claim 8, wherein the electronic file includes image and text to print on at least one of an inkjet or laser printer.

14. A portable location marker, comprising:
one or more predefined lines to facilitate folding the portable location marker;
one or more shapes that define one or more apertures in the portable location marker once the shapes are removed; and
indicia on the portable location marker that provides instructions to an unmanned aerial vehicle (UAV).

15. The portable location marker as in claim 14, further comprising a shipping container having a first side, the first side comprising an outline defining an outer boundary of the portable location marker, the portable location marker being removable from the first side.

16. The portable location marker as in claim 15, wherein the shipping container comprises a corrugated box.

17. The portable location marker as in claim 14,
wherein the indicia on the portable location marker comprises one or more a first indicia identifying the portable location marker and further comprises a second indicia that provides delivery information to the UAV associated with a physical location.

18. The portable location marker as in claim 17, wherein the second indicia is affixed to the portable location marker.

19. The portable location marker as in claim 17, wherein the second indicia is provided as an electronic file that can be printed and affixed to the portable location marker.

20. The portable location marker as in claim 14, further comprising instructions on the portable location marker for configuring the portable location marker into a gust-resistant shape.

21. The portable location marker as in claim 14, wherein the one or more predefined lines comprise at least one line of weakness.

* * * * *

UNITED STATES PATENT AND TRADEMARK OFFICE
CERTIFICATE OF CORRECTION

PATENT NO. : 10,268,208 B1
APPLICATION NO. : 15/795160
DATED : April 23, 2019
INVENTOR(S) : James Matthew Hopwood Thomas et al.

Page 1 of 1

It is certified that error appears in the above-identified patent and that said Letters Patent is hereby corrected as shown below:

In the Claims

Column 12, Line 39, change "marker comprises one or more a first indicia" to --marker comprises a first indicia--.

Signed and Sealed this
Eighteenth Day of June, 2019

Andrei Iancu
*Director of the United States Patent and Trademark Office*